United States Patent
Zhao

(10) Patent No.: US 11,057,416 B2
(45) Date of Patent: Jul. 6, 2021

(54) ANALYZE CODE THAT USES WEB FRAMEWORK USING LOCAL PARAMETER MODEL

(71) Applicant: HEWLETT PACKARD ENTERPRISE DEVELOPMENT LP, Houston, TX (US)

(72) Inventor: Lu Zhao, Sunnyvale, CA (US)

(73) Assignee: Micro Focus LLC, Santa Clara, CA (US)

(*) Notice: Subject to any disclaimer, the term of this patent is extended or adjusted under 35 U.S.C. 154(b) by 275 days.

(21) Appl. No.: 15/031,431

(22) PCT Filed: Dec. 19, 2013

(86) PCT No.: PCT/US2013/076650
§ 371 (c)(1),
(2) Date: Apr. 22, 2016

(87) PCT Pub. No.: WO2015/094300
PCT Pub. Date: Jun. 25, 2015

(65) Prior Publication Data
US 2016/0241585 A1    Aug. 18, 2016

(51) Int. Cl.
*H04L 29/06* (2006.01)
*G06F 8/75* (2018.01)
*G06F 21/56* (2013.01)

(52) U.S. Cl.
CPC ............ *H04L 63/1433* (2013.01); *G06F 8/75* (2013.01); *G06F 21/563* (2013.01)

(58) Field of Classification Search
CPC .................................................. H04L 63/1433
USPC .......................................................... 726/25
See application file for complete search history.

(56) References Cited

U.S. PATENT DOCUMENTS

| | | | |
|---|---|---|---|
| 2003/0159063 A1 | 8/2003 | Apfelbaum et al. | |
| 2010/0325620 A1 | 12/2010 | Rohde et al. | |
| 2011/0030061 A1* | 2/2011 | Artzi ................... | G06F 11/3604 726/25 |
| 2011/0126213 A1† | 5/2011 | Macken | |
| 2011/0197180 A1 | 8/2011 | Huang et al. | |
| 2012/0102471 A1* | 4/2012 | Artzi ........................ | G06F 8/30 717/133 |
| 2012/0102474 A1* | 4/2012 | Artzi ........................ | G06F 8/75 717/157 |

(Continued)

FOREIGN PATENT DOCUMENTS

WO  PCT-WO2007025279 A2    3/2007

OTHER PUBLICATIONS

Chen, H., et al., Data-flow Based Vulnerability Analysis and Java Bytecode, 7th WSEAS International Conference on Applied Computer Science, Nov. 21-23, 2007, pp. 201-207.

Doupe, A., et al., Fear the Ear: Discovering and Mitigating Execution After Redirect Vulnerabilities, CCS '11, Oct. 17-21, 2011, 11 pages.

(Continued)

*Primary Examiner* — Harris C Wang

(57) ABSTRACT

Example embodiments disclosed herein relate to analyze code of a web application associated with a framework. The code is loaded. Data objects of the framework that are used by the code are modeled using local parameters with explicit control flow. The code is analyzed to identify at least one vulnerability by analyzing one or more execution paths of the code using the explicit control flow.

20 Claims, 4 Drawing Sheets

(56) References Cited

U.S. PATENT DOCUMENTS

| | | | | |
|---|---|---|---|---|
| 2012/0131670 | A1* | 5/2012 | Artzi | G06F 21/00 726/22 |
| 2012/0151449 | A1* | 6/2012 | Maeda | G06F 11/3604 717/126 |
| 2013/0055220 | A1† | 2/2013 | Murthy | |
| 2013/0086688 | A1 | 4/2013 | Patel et al. | |
| 2013/0091487 | A1 | 4/2013 | Chandra et al. | |
| 2013/0205399 | A1* | 8/2013 | Kalman | G06F 21/10 726/25 |
| 2013/0312102 | A1* | 11/2013 | Brake | G06F 21/577 726/25 |
| 2013/0339311 | A1† | 12/2013 | Ferrari et al. | |
| 2014/0082327 | A1* | 3/2014 | Ghose | G06F 11/00 712/205 |
| 2015/0332055 | A1* | 11/2015 | Siman | G06F 16/285 726/25 |
| 2016/0241585 | A1* | 8/2016 | Zhao | G06F 21/563 |

OTHER PUBLICATIONS

International Search Report & Written Opinion, PCT Patent Application No. PCT/US2013/076650, dated Aug. 21, 2014, 9 pages.
Jovanovic, N., et al., Pixy: a Static Analysis Tool for Detecting Web Application Vulnerabilities (technical Report), Vienna University of Technology, Aug. 15, 2005, 19 pages.
Liu, Y., et al., Static Information Flow Analysis with Handling of Implicit Flows and a Study on Effects of Explicit Flows VS Implicit Flows, Rensselaer Polytechnic Institute, Oct. 23, 2009, 10 pages0
Tripp. O., et al.. Andromeda: Accurate and Scalable Security Analysis of Web Applications, Tel Aviv University, Jan. 9, 2013, 16 pages.
Delisle et al., Sun Microsystems: JavaServer Pages™, Specification, Version 2.2, MaintenaceRelease2, Dec. 10, 2009 (594 pages).
Mordant. Rajiv, Sun Microsystems, Java™ Servlet Specification, Version 3.0, Dec. 2009 (230 pages).
Srioharan et al., F4F: Taint Analysis of Framework-based Web Applications, OOPSLA 2011 (38 pages).

\* cited by examiner
† cited by third party

ANALYZE CODE THAT USES WEB FRAMEWORK USING LOCAL PARAMETER MODEL

BACKGROUND

Service providers and manufacturers are challenged to deliver quality and value to consumers, for example by providing secure applications. Software security testing is used to identify vulnerabilities in an application such as a web application. Static Code Analysis is the analysis of computer software that is performed without actually executing programs.

BRIEF DESCRIPTION OF THE DRAWINGS

The following detailed description references the drawings, wherein.

DETAILED DESCRIPTION

Figure 1:
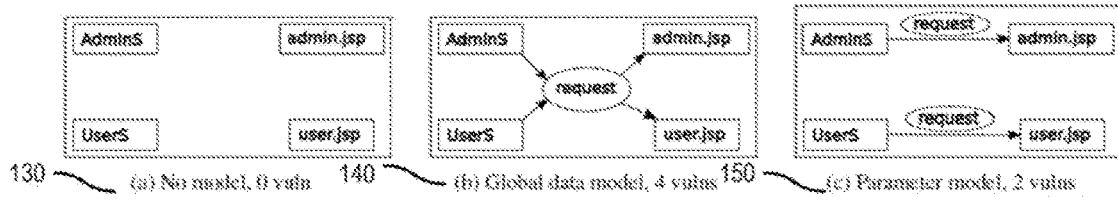
FIG. 1 is a diagram showing sample code with example vulnerabilities found using modeling to determine vulnerabilities associated with the code, according to various examples.

Software security testing is used to identify vulnerabilities in an application such as a web application. Static Code Analysis is the analysis of computer software that is performed without actually executing programs. Secure Code Analysis (SCA) is a static analyzer for security that analyzes the source code of applications to report security vulnerabilities. One application area of SCA is analyzing applications such as web applications. Examples of such application environments include the JAVA SERVLET, JAVASERVER PAGES (JSP), .NET, JavaEE, ASP.NET, WebObjects, web2py, OpenACS, Zend Framework, and Django framework technologies. These provide a general framework for developing web applications (e.g., JAVA web applications) by managing the life cycles of many data objects such as protocol requests and responses and providing functions that allow applications to transfer both data and control from one web resource to another. Other types of applications and/or application frameworks can also be used.

Using the frameworks means that application developers do not have to write code that implements these functionalities. However, the frameworks present challenges for static analyzers because the code that implements the functionalities is not a part of the application code and it is a challenge for the analyzer to report vulnerabilities that are present in the combination of the application code and framework usage without special measures taken to model the framework.

One approach could be a global data model to analyze web frameworks. Critical data objects would be treated as global variables through which data can flow from one method to another even if there is no apparent connection between these methods in application code. This model solves the problem of missing vulnerabilities that are present. However, it also causes a negative effect: it creates false data flows, which can result in false reports of vulnerabilities that are not actually present in the code. The number of false vulnerabilities can be very high, and auditing analysis results manually can become impractical.

Accordingly, various embodiments described herein relate to an approach to analyze web applications while avoiding false vulnerabilities. The approaches described herein create a precise data and control flow model where one or more data objects provided by the framework are treated as method parameters or fields of method parameters, and control flows between methods are explicitly created based on the specifications of the web framework in use. In some examples, the model treats the data objects as local variables of methods and bridges data flows across methods with explicit method calls. The objects can include simple variables (e.g., values of primitive data types) and/or references to class instances.

Static code analysis includes a set of techniques to find security vulnerabilities in code. Examples of such vulnerabilities are cross-site scripting (XSS), command injection, SQL injection, JavaScript Hijacking, buffer overflows, deadlocks and race conditions, format string vulnerabilities, access control issues, etc. One of techniques to find some of the vulnerabilities is taint analysis. Other examples include analyses for one or more of the other vulnerabilities described.

In the example of taint analysis, user input is considered untrusted data. Applications may propagate the untrusted data from one variable to another and to other places in code. When the untrusted data is used to perform certain operations (e.g., sending feedback to users, executing a command, querying a database, etc.), it can cause a security policy violation. This can result in compromised computer systems. Taint analysis discovers where the untrusted data enters an application, how it is propagated through the application, and where it causes security violations.

FIG. 1 is a diagram showing sample code with example vulnerabilities found using modeling to determine vulnerabilities associated with the code, according to various examples. FIG. 1 compares the data flows and the numbers of XSS vulnerabilities reported under example approaches for the example in Program 100. In the example, untrusted user input enters the AdminS servlet 108 at line 3 through the getParameter function call. Then it is attached to the request object 110, and finally the servlet forwards 112 the user request to the admin.jsp page. The JSP page sends the untrusted input data to the user, which can cause an XSS attack. A similar process takes place between the UserS servlet 118 and the user.jsp page.

Therefore, there are two XSS vulnerabilities in this application. When a static security analyzer analyzes the source code without using any model for critical data objects such as the request and response, it does not report the XSS vulnerabilities as shown in the no model example 130 because there is no connection between servlets and JSP pages by merely examining the application code statically.

The global data model example 140 shows an example of that XSS vulnerabilities are determined using the global data model, which treats the request and response as globals. A write to a global causes data to flow to all reads from the same global. The analyzer reports the vulnerabilities because the model tells the analyzer that the request object in admin.jsp is the same global request object in AdminS. Using the global data model, untrusted data can now flow from the latter to the former through the request object. The arrows in the figure indicate the direction of untrusted data flow. A similar data flow happens between the UserS servlet and the user.jsp page. However, in this example, the request object causes false data flows: untrusted data can also flow from AdminS to user.jsp and from UserS to admin.jsp through the global request object. So there are total of four XSS vulnerabilities reported by the analyzer with two being false.

The number of false reports can get large for applications with a moderate number of servlets and JSP pages. With the approaches described herein, the number of false reports can be reduced, Suppose that there are M servlets with each forwarding its request to a single JSP page. Then the total number of true XSS vulnerabilities is M, while the global data model causes $M*M=M^2$ vulnerabilities to be reported. In an application with M=20, the number of false vulnerabilities is $20^2-20=380$. It would be time-consuming to audit all vulnerabilities, if possible, to discover the real ones.

A local parameter model example 150 illustrates the data flows enabled by the solution described herein. Certain data objects such as request and response are treated as method parameters or fields of method parameters. This particular example defines the request and response objects as parameters, while other web frameworks such as Struts may not do so. In that case, artificial parameters are added to the methods in the model.

This treatment of certain data objects removes the false data flows generated by using a global data model. In some examples, the original code can be transformed in certain ways. For example, when there is a read from a field of an artificial parameter, the model can replace the read with a field access. Further, when there is a write, the model can substitute it for an assignment statement. Explicit method calls are created to enable tracking data flows across functions on these method parameters.

Call relationships can be discovered based on the specifications of the framework in use (e.g., for JAVA, the Servlet and JSP specifications provide information about what method should be invoked when there is a forward function call). For the example code in FIG. 1, lines 5 and 13 can be replaced with new direct function calls to the service methods of admin.jsp and user.jsp, respectively, and pass in the parameterized variables: request and response. Accordingly, an analyzer can now report the real vulnerabilities without the false ones generated by the global data model. This also removes the costs associated with auditing the false reports.

Figure 3:
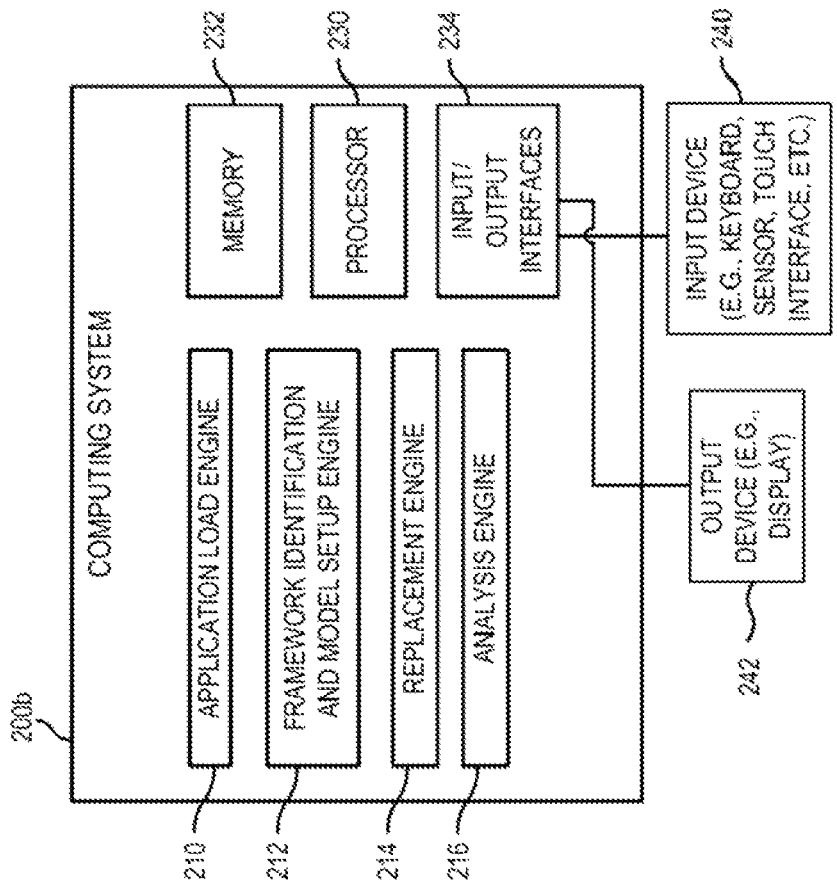
FIGS. 2 and 3 are block diagrams of a device capable of analyzing code to determine vulnerabilities based on a local parameter model, according to various examples.
Figure 2:
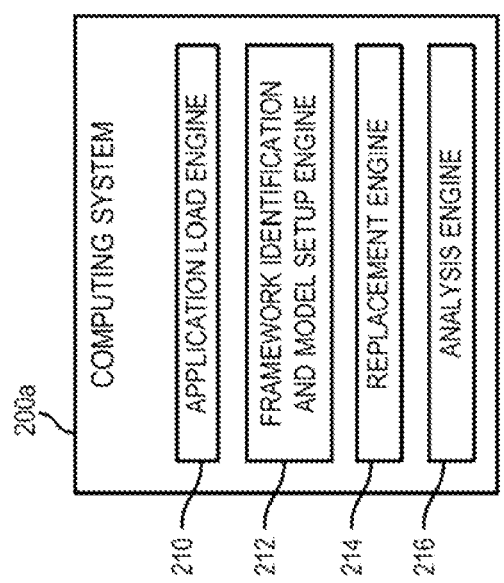

FIGS. 2 and 3 are block diagrams of a device capable of analyzing code to determine vulnerabilities based on a local parameter model, according to various examples. Computing systems 200a, 200b include components that can be utilized to determine vulnerabilities of code based on analysis. The respective computing systems 200a, 200b may be a notebook computer, a desktop computer, a tablet computing device, a wireless device, a server, a workstation, or any other computing device that is capable of the code analysis.

An application load engine 210 can be used to load code of an application that uses a particular framework for code analysis. In certain examples, loading the code need not execute the code. Further, the application itself uses the framework. The application load engine 210 need not use a framework or the same framework.

In one example, a framework identification and model setup engine 212 can determine what framework is used in the code and what data objects of the framework should be modeled as local parameters. One or more data objects associated with the framework can be modeled. The modeling can be based on a specification associated with the framework. Different frameworks and/or versions of frameworks can have different models. The model can use local parameters with explicit control flows based on the respective specification. In some examples, certain coding features present in the code can be used to determine the associated framework/specification. The model can then be loaded.

In certain examples, a local parameter is a function parameter whose scope is only valid inside the function. Examples of local parameters include: request, response etc. Further, explicit control flow can refer to the order in which individual statements, instructions, function calls, etc. are evaluated. The explicit control flow can link particular objects of the framework across different methods and is implemented in the form of direct function calls.

In one example, a replacement engine 214 can replace corresponding data objects with one or more local parameters. In some examples, the replacement engine 214 can replace existing framework function calls with new function calls. In other examples, data objects can be replaced with local parameters.

The analysis engine 216 can identify one or more security vulnerabilities by analyzing one or more execution paths of the code using the explicit control flow. Because the control flow is explicit, the usage of an object can be tied to particular destinations. The destination for a particular object can be determined by analyzing the code. In the example of FIG. 1, when a control transfer defined by the framework happens if the code was executed at line 5, the local parameter model replaces the code at line 5 with direct function calls to the servicing method of the adminjsp page. As a result, the AdminS 108 class can forward users to the adminjsp page statically, and this behavior is explicitly modeled using the approaches described herein. This model does not pollute other web resources as would be done in a global model.

In one example, the model uses one or more artificial parameters to represent the data object(s). In this example, the code can include a read from a property or an attribute of one of the artificial parameters. In this case, the read can be replaced with a field access because the field access makes the read explicit to the analyzer.

In another example, where the model use artificial parameters, the code can include a write to a property or an attribute of one of the artificial parameters. The write can be replaced with an assignment statement to a field of the artificial parameter.

The engines 210, 212, 214, 216 include hardware and/or combinations of hardware and programming to perform functions provided herein. Moreover, modules (not shown) can include programing functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine.

A processor 230, such as a central processing unit (CPU) or a microprocessor suitable for retrieval and execution of instructions and/or electronic circuits can be configured to perform the functionality of any of the engines 210, 212, 214, 216 described herein. In certain scenarios, instructions and/or other information, such as code, can be included in memory 232 or other memory. Input/output interfaces 234 may additionally be provided by the computing system 200b. For example, input devices 240, such as a keyboard, a sensor, a touch interface, a mouse, a microphone, etc. can be utilized to receive input from an environment surrounding the computing system 200b. Further, an output device 242, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 234.

Each of the engines and modules may include, for example, hardware devices including electronic circuitry for implementing the functionality described herein. In addition or as an alternative, each module may be implemented as a series of instructions encoded on a machine-readable storage medium of computing system 200 and executable by processor 230. It should be noted that, in some embodiments, some modules are implemented as hardware devices, while other modules are implemented as executable instructions in conjunction with hardware.

Figure 4:
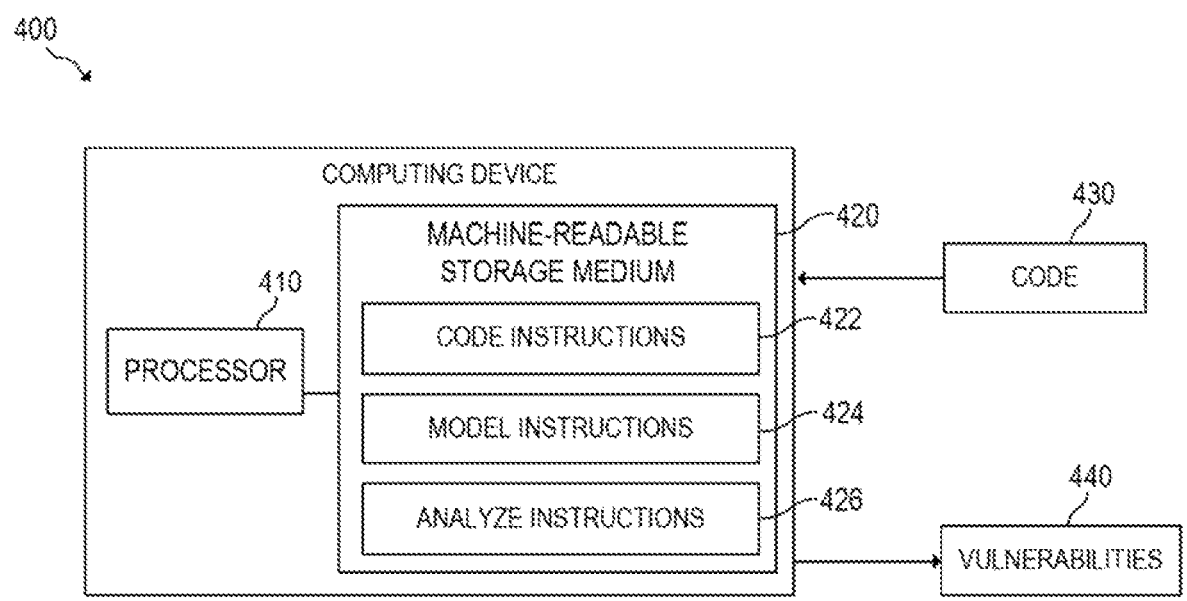
FIG. 4 is a block diagram of a computing device capable of analyzing code to determine vulnerabilities based on a local parameter model, according to one example.

FIG. 4 is a block diagram of a computing device capable of analyzing code to determine vulnerabilities based on a local parameter model, according to one example. The computing device 400 includes, for example, a processor 410, and a machine-readable storage medium 420 including instructions 422, 424, 426 for analyzing code. Computing device 400 may be, for example, a notebook computer, a slate computing device, as workstation, a server, a portable reading device, a wireless email device, a mobile phone, or any other computing device capable of analyzing code.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement the tasks described herein. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for determining vulnerabilities of code analyzed using a local parameter model (e.g., as described in method 500).

Code instructions 422 can be processed by processor 410 to load code 430. The code can be associated with a framework. Data objects of the framework used by the code can be modeled using local parameters with explicit control flow as described herein. In certain examples, data objects can include one or more request objects and/or one or more response objects. In some examples, a request object is used to retrieve values from a client browser to be passed to a server. In other examples, a response object is used to send output to a user from a server.

Model instructions 424 can be used to determine a model associated with the code 430. In some examples, the code 430 can include one or more cues to determine which model to use. In one example, the code 430 can include functions that link the code 430 to a framework and/or framework version. This can be used to determine what model to use. For example, the code can be analyzed to determine the model to use based on matching (e.g., fingerprinting or signature matching). The model can be determined by matching code patterns to a specification associated with the framework. In some examples, certain objects can be associated with explicit method calls, field access, assignments, combinations thereof, etc.

Analyze instructions 426 can be used to analyze the code 430 to determine vulnerabilities 440. One or more execution paths of the code 430 can be analyzed using static code analysis and following explicit control flow used in the model. In some examples, the model can cause replacing of portions of the code with modeled local parameters. In some examples, the specification may not define a data object(s) as parameters, but the model can use artificial parameters to represent the data object(s). Further, the specification can be used to determine explicit method calls with modeled data objects in the code during analysis.

In one example, the code 430 can include a read from a property or an attribute of one of the artificial parameters. In this scenario, the read from the object can be replaced with a field access. This modeling can be used to determine vulnerabilities that correspond to field access or reading data.

In another example, the code 430 can include a write to a property and/or an attribute of one of the artificial parameters. The write can be replaced with an assignment statement to a field of the respective local parameter. As noted, the modeling can be used to determine vulnerabilities that correspond to writing to data/deleting data.

Figure 5:
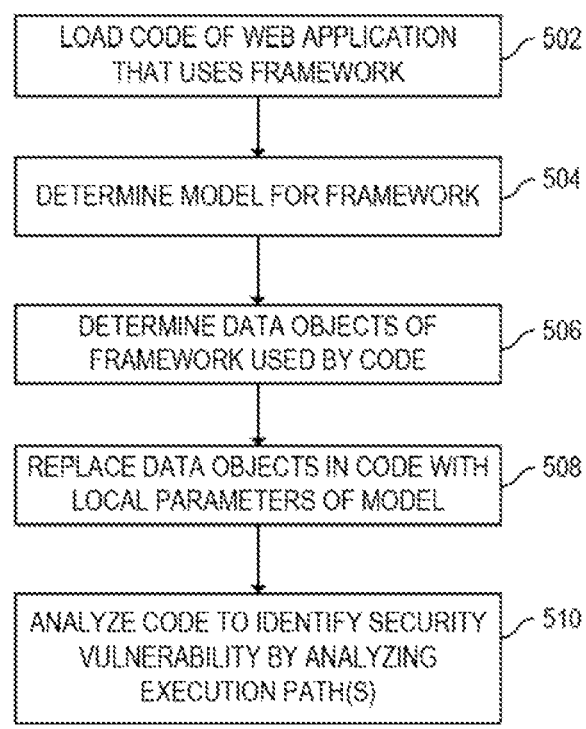
FIG. 5 is a flowchart of a method for determining vulnerabilities of code analyzed using a local parameter model, according to one example.

FIG. 5 is a flowchart of a method for determining vulnerabilities of code analyzed using a local parameter model, according to one example. Although execution of method 500 is described below with reference to computing device 400, other suitable components for execution of method 500 can be utilized (e.g., computing system 200). Additionally, the components for executing the method 500 may be spread among multiple devices. Method 500 may be implemented in the form of executable instructions stored on a machine-readable storage medium, such as storage medium 420, and/or in the form of electronic circuitry.

At 502, code of a web application using a framework can be loaded by the computing device 400. As used herein, the web application using the framework refers to the web application code that uses one or more features of the framework. A code analyzer need not use the same framework for analysis.

At 504, the computing device 400 can determine a model for the framework. The model can use local parameters with explicit control flow based on a specification of the framework. In one example, the determination can be based on selection. In another example, the determination can be based on processing of code loaded at 502. In some examples, the model can be created manually by following the specification. The model can be used to replace one or more lines of code calling framework functions.

The model itself can be determined by analyzing the framework. It can be determined which objects are global and which objects are not global. Global objects can be modeled using a global model. Non-global objects can be modeled using other approaches. For example, data objects that are not global can be identified. When a user receives a response based on a request, it may be considered not global (e.g., a different user may receive a different response). The framework can be analyzed to determine how the dataflow happens. Then a flow can be modeled from point A to point B based on the effect of a method on the object. Explicit method calls can be established by following the specification in this manner.

Data objects of the framework used by the code can be determined at 506. In some examples, a set of data objects and/or associated parameters to be used in the model can be listed with the model. These data objects can be compared to the code to determine whether the objects are present in the code.

If present, at 508, one or more of the data objects in the code can be replaced with local parameters of the model. In some examples, if the specification does not define the data objects as parameters, the model can use one or more artificial parameters to represent the data objects. In one example, the code can include a read from a property or an attribute of one of the artificial parameters. The read can be replaced with a field access. In another example, the code can include a write to a property or an attribute of one of the artificial parameters. The write can be replaced with an assignment statement.

In some examples, the specification can include parameters associated with functions called. In certain examples, the code may not have these parameters called out. Artificial parameters can be used in place of these parameters.

At 510, the code can be analyzed using the model to identify at least one security vulnerability by analyzing one or more execution paths of the code using the explicit control flow of the model. As noted, the code analysis can be a static code analysis that helps verify that the code is trustworthy. The static code analysis can scan the code, identify root causes of software security vulnerabilities, and correlate and/or prioritize results. In some examples, the embodiments described herein can allow for additional code to be analyzed while limiting false security vulnerabilities being found.

What is claimed:

1. A non-transitory machine-readable storage medium storing instructions that upon execution by a processor, cause the processor to perform software security testing of a web application to identify a vulnerability of the web application by:
    loading code of the web application, the web application associated with a framework and using data objects of the framework including a request object of the framework and response object of the framework;
    determining a model of the framework, the model identifying the data objects of the framework used by the web application including the request object and the response object of the framework, wherein the request object and the response object are global objects of the framework, wherein the data objects are modeled by the model using local artificial parameters defining explicit control flow, wherein the model is based on a specification of the framework, and wherein the specification does not define the data objects as parameters;
    replacing, in the code of the web application, data objects of the framework used by the code of the web application with the local artificial parameters of the model; and
    analyzing the code to identify the vulnerability by analyzing one or more execution paths of the code using the explicit control flow defined in the local artificial parameters of the model.

2. The non-transitory machine-readable storage medium of claim 1, wherein the code includes a read from a property or an attribute of one of the local artificial parameters, and wherein the read is replaced in the code of the web application with a field access.

3. The non-transitory machine-readable storage medium of claim 1, wherein the code includes a write to a property or an attribute of one of the local artificial parameters, and wherein the write is replaced in the code of the web application with an assignment statement to a field of a respective local artificial parameter of the local artificial parameters.

4. The non-transitory machine-readable storage medium of claim 1, wherein the instructions upon execution cause the processor to use the specification to determine explicit method calls with modeled data objects in the code during the analyzing.

5. A method for performing software security testing of a web application to identify a security vulnerability of the web application, the method comprising:
    loading, by a security testing system, code of the web application, the web application associated with a framework and using data objects of the framework including a request object of the framework and a response object of the framework;
    determining, by the security testing system, a model for the framework, wherein the model uses local parameters defining explicit control flow for the request object of the framework and the response object of the framework based on a specification of the framework, wherein the request object and the response object comprise global objects of the framework;
    loading, by the security testing system, the code of the web application that uses the framework;
    determining, by the security testing system, data objects including the request object and the response object of the framework used by the code;
    replacing, by the security testing system, in the code of the web application, the request object with the local parameters defining the explicit control flow for the request object and the response object with the local parameters defining the explicit control flow for the response object; and
    analyzing, by the security testing system, the code using the model to identify the security vulnerability by analyzing one or more execution paths of the code using the explicit control flow defined in the local parameters.

6. The method of claim 5, wherein the specification does not define the data objects as parameters, and wherein the model uses artificial parameters to represent the request object and the response object.

7. The method of claim 6, wherein the code includes a read from a property or an attribute of one of the artificial parameters, and wherein the read is replaced in the code of the web application with a field access.

8. The method of claim 6, wherein the code includes a write to a property or an attribute of one of the artificial parameters, and wherein the write is replaced in the code of the web application with an assignment statement.

9. A computing system comprising:
a processor; and
a memory coupled with and readable by the processor and storing instructions which, when executed by the processor, cause the processor to perform software security testing of a web application to identify a security vulnerability of the web application by:
loading code of the web application that uses a framework;
determining a plurality of data objects of the framework used by the code, the plurality of data objects including a request object and a response object used by the code, wherein the request object and the response object are global objects of the framework;
replacing the request object with local parameters of a model defining explicit control flow for the request object and the response object with local parameters of the model defining explicit control flow for the response object, wherein the model uses the local parameters with explicit control flow based on a specification of the framework; and
identifying the security vulnerability by analyzing one or more execution paths of the code using the explicit control flow defined in the local parameters of the model.

10. The computing system of claim 9, wherein the model uses artificial parameters to represent the request object and the response object, and wherein the code includes a read from a property or an attribute of one of the artificial parameters, and wherein the read is replaced in the code of the web application with a field access.

11. The computing system of claim 9, wherein the model uses artificial parameters to represent the request object and the response object, wherein the code includes a write to a property or an attribute of one of the artificial parameters, and wherein the write is replaced in the code of the web application with an assignment statement to a field of a respective artificial parameter.

12. The non-transitory machine-readable storage medium of claim 1, wherein the request object is to retrieve a value from an entity, and the response object is to send a value to the entity.

13. The non-transitory machine-readable storage medium of claim 1, wherein the explicit control flow comprises function calls to track the local parameters across methods.

14. The non-transitory machine-readable storage medium of claim 13, wherein the explicit control flow refers to an order of evaluation of instructions of the code and the framework.

15. The method of claim 5, wherein the request object is to retrieve a value from an entity, and the response object is to send a value to the entity.

16. The method of claim 5, wherein the explicit control flow comprises function calls to track the local parameters across methods.

17. The computing system of claim 9, wherein the request object is to retrieve a value from an entity, and the response object is to send a value to the entity.

18. The method of claim 16, wherein the explicit control flow refers to an order of evaluation of instructions of the code and the framework.

19. The computing system of claim 9, wherein the explicit control flow comprises function calls to track the local parameters across methods.

20. The computing system of claim 19, wherein the explicit control flow refers to an order of evaluation of instructions of the code and the framework.

* * * * *